June 1, 1937.  A. M. YOUNG  2,082,674
FLOATING WING ASSEMBLY
Filed Sept. 12, 1933  2 Sheets-Sheet 1
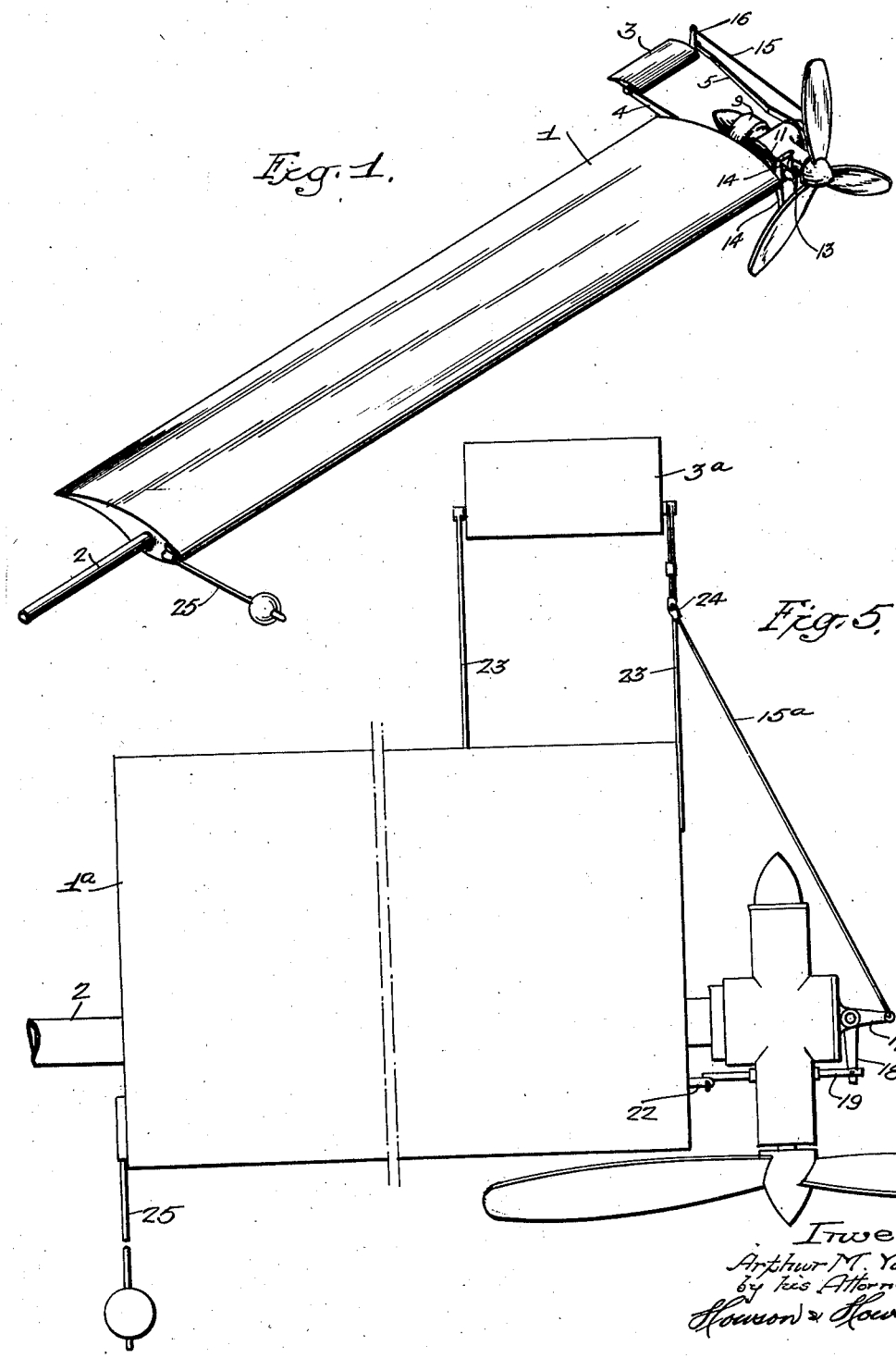

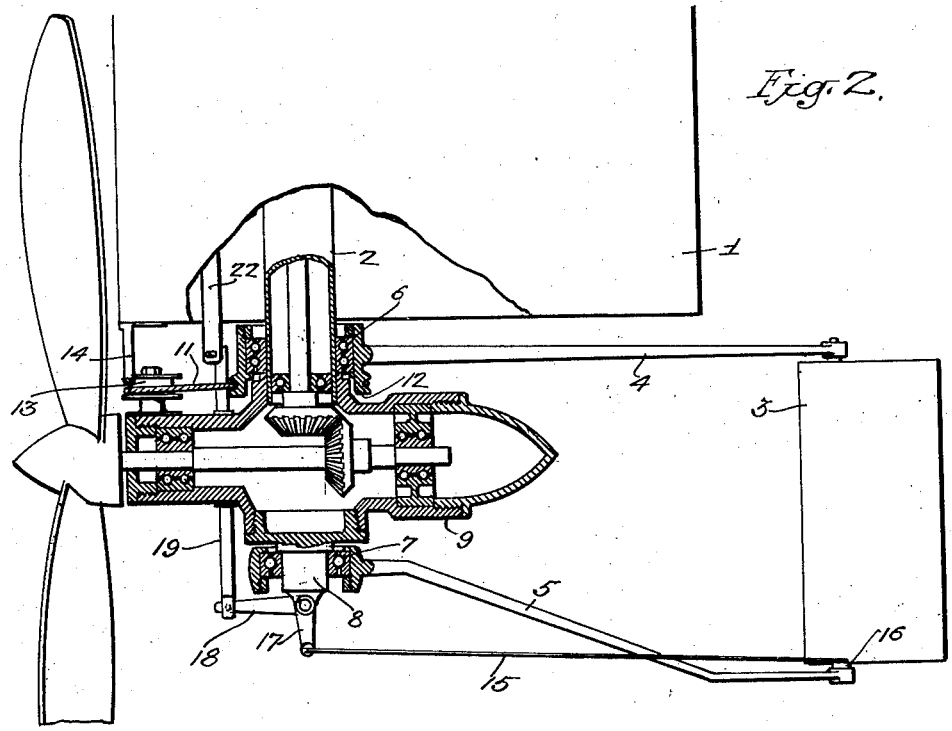
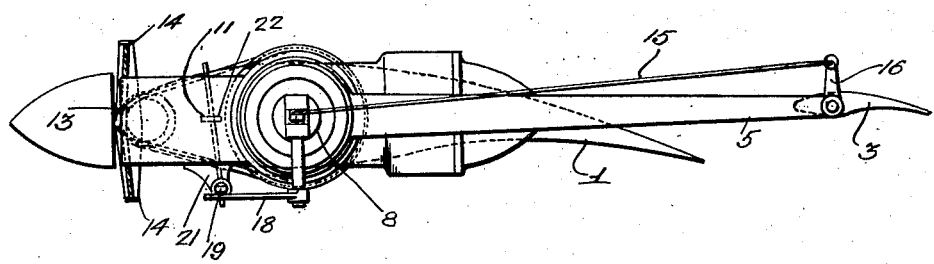
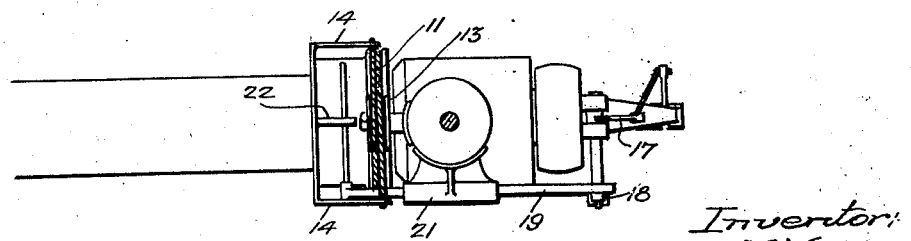

Patented June 1, 1937

2,082,674

UNITED STATES PATENT OFFICE 2,082,674

FLOATING WING ASSEMBLY

Arthur M. Young, Radnor, Pa.

Application September 12, 1933, Serial No. 689,116

9 Claims. (Cl. 244—82)

The object of this invention is to provide an improved floating wing construction of a type suitable, for example, for use as a lifting blade for helicopters.

More specifically, an object of the invention is to provide in a wing of the stated type an improved aileron construction which shall be more effective and positive than the prior devices in bringing the wing to a desired angle.

Another object of the invention is to provide a wing and aileron assembly of the general character set forth which is free of certain disadvantages inherent in the prior types of assembly hereinafter more specifically set forth.

To this latter end, an object of the invention is to provide a wing and aileron assembly which shall be more inherently stable and less subject to uncontrolled tipping than the corresponding assemblies of the prior art.

A still further object of the invention is to provide a floating wing assembly that will be free from objectionable flapping tendencies.

The foregoing and other objects hereinafter set forth are attained by the construction illustrated in the attached drawings, in which:

Figure 1 is a view in perspective of a wing assembly made in accordance with my invention;

Fig. 2 is a fragmentary plan and partial sectional view of the outer end of the wing illustrating the aileron mount and control;

Fig. 3 is an outer end elevation of the assembly;

Fig. 4 is a front elevation of the assembly with the propeller removed, and

Fig. 5 is a top plan view illustrating a modified assembly within the scope of the invention.

With reference to the drawings, 1 is the wing which in accordance with the "floating" principle is mounted for rotation upon a tube 2, this tube extending longitudinally through the wing. 3 is the aileron which causes the wing to adjust itself according to the wind direction.

With reference to Fig. 2, it will be noted that in the present instance the aileron 3 is carried by arms 4 and 5, which arms are journaled through the medium of anti-friction bearings, 6 and 7, upon the outer projecting end of the tube 2, in the one instance, and in the other instance upon a journal element 8 at the outer end of a casing 9 rigidly mounted on the end of the tube 2. The aileron is operatively connected with the wing 1 through the medium of a belt or cable 11 which passes around a pulley 12 formed on the hub of the arm 4 and around an idler pulley 13 journaled on the casing 9, the ends of the belt 11 being attached respectively to the upper and lower ends of a vertical strut 14 at the outer end of the wing. It will be apparent that with this construction any movement of the arms 4 and 5 about their common axis must necessarily result in an adjustment about its own axis and in the same direction of the wing 1. The aileron 3 is mounted between the arms 4 and 5 for rotation about a longitudinal axis which may correspond substantially to its center of pressure, and the position of the aileron about this axis is controllable through a linkage comprising a connecting rod 15, which extends from the upper end of an arm 16 on the aileron to one arm 17 of a bell crank lever journaled at the outer end of the journal member 8. The other arm 18 of the bell crank has attached to its outer end a rod 19 slidably mounted in a bracket 21 at the under side of the casing 9. The rod 19 is longitudinally adjusted in the present instance through a rod 22 which extends longitudinally through the wing 1 to the operator's position (not shown). It will be noted that the connection between the rods 19 and 22 is a flexible one, automatically compensating for movement of the wing 1. It will be noted further that the joint between the connecting rod 15 and the arm 17 of the bell crank lever is a flexible one, and that the said arm 17 is mounted approximately on the axis of the arms 4 and 5, so that adjustment of the arms 4 and 5 about their axis has a minimum effect upon the angular position about its own axis of the aileron 3. By placing the arm 17 somewhat below this geometrical center, an additional stabilizing effect upon the system may be obtained.

It will be noted that in the aforedescribed assembly the aileron is supported independently of the wing 1, this being a preferred construction for reasons hereinafter set forth. Substantially the same system of aileron control, however, may be used in that type of assembly wherein the aileron is supported upon a rigid mount secured to the wing itself. A wing embodying this type of construction is illustrated in Fig. 5. In this instance, the wing 1a is provided at the outer end with rearwardly extending rods 23, 23 which constitute the support for the aileron 3a. The aileron is mounted upon these rods for oscillation, and the angular position of the aileron about its axis is controlled through the medium of a connecting rod 15a, which in this instance is provided with the universal joint 24 required by the offset relation between the bell crank lever 17—18 and the aileron 3a. In all other respects this control conforms with the control previously described, and the corresponding parts are designated by the same reference numerals.

In assemblies of this character, it has been found that frequently when in free flight the wings have a tendency to develop a violent flapping or oscillation which creates excessive strains in the wing structure and sometimes causes complete loss of lift. I have discovered that this undesirable action is due to an inherent lack of balance in the wing structure with respect to the axis of oscillation. In this type of wing, it is practically impossible to obtain a true balance without special means, for the reason that the center of pressure of any aerofoil section is considerably ahead of the geometric center, and this natural condition of unbalance is accentuated in that type of construction shown in Fig. 5 wherein the aileron is mounted on the wing itself.

I have found that this condition may be overcome by use of a properly constituted counterweight, and in Figs. 1 and 5 I have shown a desirable form of counterbalance in the form of a weighted arm 25 projecting forwardly from the forward edge of the wing and preferably at the inner end of the latter. Since a minimum weight in the assembly as a whole is highly desirable, I prefer to employ a relatively long weight arm, and one of the desirable characteristics of the embodiment of my invention illustrated in Figs. 1 to 4, inclusive, resides in the fact that the aileron being supported independently of the wing 1 makes possible an accurately counterbalanced wing with a relatively light counterbalance weight. By locating the weight at the inner end of the wing, I eliminate much of the centrifugal force and air resistance that it would produce if placed elsewhere.

By the foregoing construction, I have provided a floating wing assembly having materially improved operating characteristics as compared with the floating wing assemblies of the prior art. My method of aileron control constitutes in itself a material improvement and simplification over the controls of the prior art; and by mounting the aileron as illustrated in Figs. 1 to 4 independently of the wing, I have materially improved the operating characteristics of this element of the assembly as well as improving the characteristics of the assembly as a whole. An aileron mounted and controlled as described is materially more effective and positive in bringing the wing to a desired angle, since the construction takes advantage of a relatively great lever arm upon which the aileron operates and represented in the present instance by the arms 4 and 5, and takes advantage further of the possibility afforded by this type of construction of an advantageous reduction gearing between the aileron and the wing. This construction also prevents the wing from following the wind direction entirely, and affords what may be termed a "semi-floating" action, as distinct from the full floating action obtained where, as under the prior practice, the aileron is mounted directly upon the wing. In the present assembly, any tendency to uncontrolled climbing of the wing on one side of its circular path is necessarily accompanied by a reduced wing angle with respect to the wind, this reduced angle limiting the climb automatically by reducing the lift on the side that tends to rise and giving in effect a correcting couple. Also as previously set forth, this type of assembly lends itself to effective counterweight balancing of the wing and to the elimination, which results from the use of a counterweight in a floating wing structure, of the tendency of the wing to undesirable flapping effects hereinbefore described.

I claim:

1. In an aircraft of the helicopter type, the combination with a supporting member movable in a normally horizontal plane about an upright axis, of a main airfoil journaled longitudinally on said member, a secondary airfoil also journaled on said member for movement independently of the main airfoil and for controlling the said movement of the latter, and reduction gearing operatively connecting the secondary to the main airfoil.

2. In an aircraft of the helicopter type, a main airfoil mounted for movement about a longitudinal axis, a lever arm mounted independently of said airfoil for movement about the same axis, a secondary airfoil for controlling the said movement of the main airfoil and adjustably mounted on said lever, and transmission means connecting said lever with the main airfoil.

3. In aircraft of the helicopter type, the combination with main airfoils rotatable in a normally horizontal plane about a vertical axis and each having a support affording rotation about a longitudinal axis, of an auxiliary airfoil operatively associated with each main airfoil for controlling the angle of attack of the latter and each adjustable about an axis with respect to its associated main airfoil, and means for interconnecting each auxiliary airfoil, its associated main airfoil and said support so that angular displacement of the auxiliary airfoil in either direction about its said axis effects an angular displacement of the main airfoil about its longitudinal axis of decreased magnitude and in the same direction.

4. In aircraft of the helicopter type, the combination with main airfoils rotatable in a normally horizontal plane about a vertical axis and each having a support affording rotation about a longitudinal axis, of an auxiliary airfoil for controlling the angle of attack of each of said main airfoils, said auxiliary airfoils being mounted independently of the respective main airfoils for adjustment about an axis with respect to the latter, and means for interconnecting each auxiliary airfoil, its associated main airfoil and said support so that angular displacement of the auxiliary airfoil in either direction about its said axis effects an angular displacement of the main airfoil about its longitudinal axis of decreased magnitude and in the same direction.

5. In an aircraft of the helicopter type, the combination with main airfoils rotatable in a normally horizontal plane about a vertical axis and each mounted for pivotation about a longitudinal axis, of an auxiliary airfoil for controlling the angle of attack of each of said main airfoils, said auxiliary airfoils being mounted independently of the respective main airfoils and being operatively connected with the latter, said main airfoils being each constructed to afford a distributed weight that excludes the center of weight from the area thereof rearwardly of said longitudinal axis.

6. In an aircraft of the helicopter type, the combination with main airfoils rotatable about an upright axis and each mounted for pivotation about a longitudinal axis, of an auxiliary airfoil for controlling the said movement of each of the main airfoils, means for mounting said auxiliary airfoils independently of the respective main airfoils, transmission means for operatively connecting the auxiliary airfoils with the respective main airfoils, said main airfoils being each constructed to afford a distributed weight that excludes the center of weight from the area thereof rearwardly of said longitudinal axis.

7. In an aircraft of the helicopter type, the combination with main airfoils rotatable about an upright axis and each mounted for pivotation about a longitudinal axis, of an auxiliary airfoil mounted on each of the main airfoils for controlling the said movement of the latter about the longitudinal axis, said main airfoils being each constructed to afford a distributed weight that excludes the center of weight from the area thereof rearwardly of said longitudinal axis.

8. An aircraft comprising main supporting airfoils rotatable about an upright axis and each mounted for pivotation about a longitudinal axis, each of said airfoils having means including a weighted arm extending forwardly of the leading edge of the airfoil for affording a distribution of weight that excludes the center of weight from the area of the airfoil rearwardly of said longitudinal axis, and said weighted arm being positioned adjacent the end of the airfoil nearest the said upright axis to thereby reduce the centrifugal forces due to said weight.

9. An aircraft comprising main supporting airfoils rotatable about an upright axis and each mounted for pivotation about a longitudinal axis, each of said airfoils having weighting means affording a distribution of weight that excludes the center of weight from the area of the airfoil rearwardly of said longitudinal axis, and said weighting means being positioned adjacent the end of the airfoil nearest the said upright axis to thereby reduce the centrifugal forces due to said weight.

ARTHUR M. YOUNG.